April 22, 1958 N. W. FOWLER ET AL 2,831,374
INDEX MECHANISM
Filed May 2, 1955 4 Sheets-Sheet 1

INVENTORS
NORMAN W. FOWLER
ROBERT F. PIGAGE
BY
Richard W. Treverton
ATTORNEY

April 22, 1958    N. W. FOWLER ET AL    2,831,374
INDEX MECHANISM
Filed May 2, 1955    4 Sheets-Sheet 2

INVENTORS
NORMAN W. FOWLER
ROBERT F. PIGAGE
BY
Richard W. Treverton
ATTORNEY

INVENTORS
NORMAN W. FOWLER
ROBERT F. PIGAGE
BY
*Richard W. Treverton*
ATTORNEY

April 22, 1958 L. G. BOUGHNER 2,831,372
VEHICLE DRIVE MECHANISMS
Filed Dec. 28, 1953 5 Sheets-Sheet 4

INVENTOR.
LAWRENCE G. BOUGHNER
BY
ATTORNEYS

United States Patent Office 2,831,374
Patented Apr. 22, 1958

2,831,374
INDEX MECHANISM

Norman W. Fowler, Brighton, and Robert F. Pigage, Irondequoit, N. Y., assignors to The Gleason Works, Rochester, N. Y., a corporation of New York Application May 2, 1955, Serial No. 505,349

10 Claims. (Cl. 74—820)

The present invention relates to an index mechanism for machine tools. The mechanism is of general application, but is especially adapted for use in gear cutting machines, such for example as that shown in Patent No. 2,448,426 granted August 31, 1948, to C. T. Galloway.

The conventional index mechanism for such a machine serves to advance the work spindle by uniform increments. For example when cutting a gear the index will successively advance the work spindle by equal increments corresponding to the angular pitch of the gear teeth. At the conclusion of a number of indexing operations, corresponding to the number of gear teeth, the work spindle has been returned to its original position. However for cutting gear segments which if complete gears would have non-integral number of teeth, the conventional index mechanism is not satisfactory because the last indexing operation does not restore the work spindle to its original position. Special means are therefore required to operate the machine in reverse or otherwise return it to its original position prior to cutting the next workpiece. Moreover it is sometimes desirable to cut one tooth of a gear segment thicker than the remaining teeth. For example in gear segments employed in automobile steering gears it is sometimes necessary to make the middle tooth slightly thicker than the others since it is subject to greatest wear. The conventional index mechanism is not adapted to meet this requirement because it advances the work spindle by equal increments.

The index mechanism of the present invention includes, in combination with the basic elements of a now-conventional index mechanism, a cam operated means to impart an additional motion to the work spindle or other driven element. When provided with such means, including a suitable cam and gearing of suitable ratio connecting the cam to the basic elements, the improved index mechanism will produce whatever angular advance of the driven element is wanted on each of several successive indexing operations, and at the conclusion thereof will leave the driven element in proper position, relative to the other parts of the machine, to begin a work operation on the next workpiece.

The foregoing and other objects and advantages of the invention will appear from the following description made with reference to the drawings, wherein:

Fig. 7 is an end view of a cam shown in Fig. 1, on a larger scale; and,

Fig. 8 is an end view of a gear segment cut by a machine having the improved mechanism.

Figure 5:
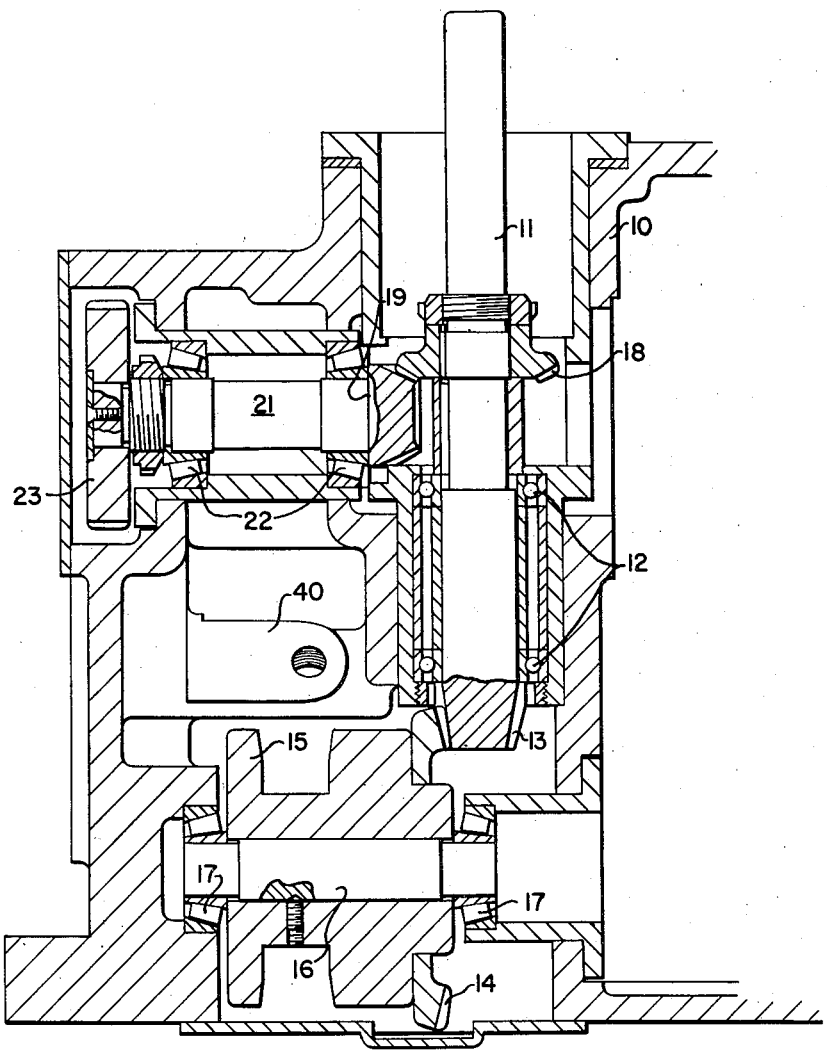
Fig. 5 is a sectional view showing the driving means for the parts shown in Fig. 3.
Figure 5:
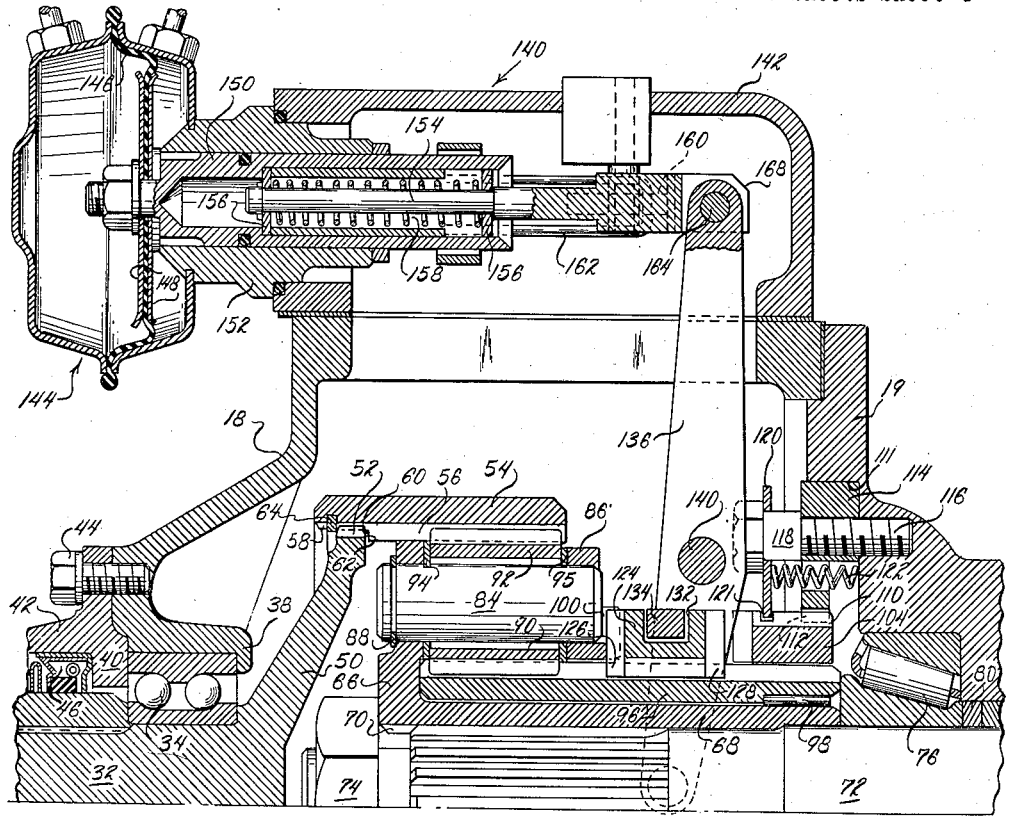

The particular mechanism that is illustrated comprises a multi-part housing 10 in which a vertical shaft 11, Fig. 5, is journaled for rotation on anti-friction bearings 12. The shaft, which is connected to a suitable power source, not shown, has formed on the lower end thereof a bevel pinion 13 meshing with a bevel ring gear 14. This gear is secured to a cam 15 whose shaft 16 is rotatable on a horizontal axis in anti-friction bearings 17. A bevel gear 18 secured to power input shaft 11 meshes with a bevel pinion 19 on a shaft 21 that is journaled for rotation in the housing on anti-friction bearings 22. Shaft 21 has affixed thereto a spur gear 23 which meshes with a spur gear 24, Fig. 3, affixed to another shaft, designated 25, which parallels shafts 16 and 21. Shaft 25, which may be considered to be the drive shaft for the index mechanism proper, is rotatable and also movable axially in bushings 26 in the housing, and has at one end a flange 27 on which is mounted a cam disc 28 that supports a drive pin 29. Gear 23 is of sufficient face width to remain in mesh with gear 24 during axial motion of the latter with shaft 25.

Figures 1, 2:
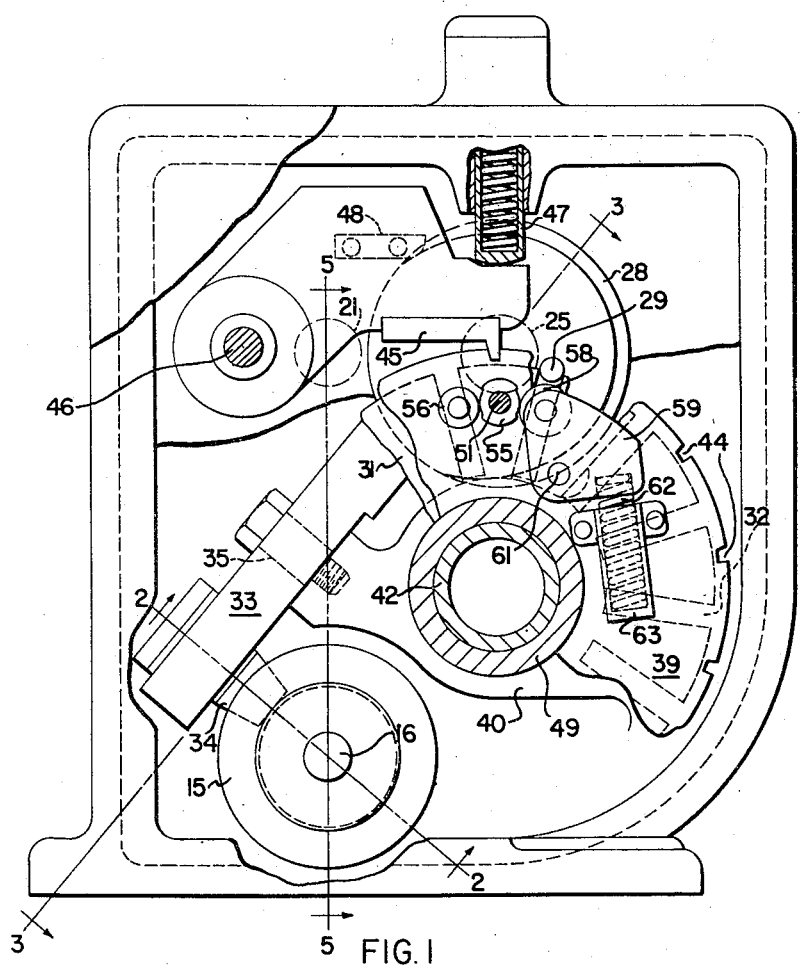
Fig. 1 is an end view of the mechanism, with certain parts omitted and others broken away and appearing in section.
Fig. 2 is a detail sectional view in plane 2—2 of Fig. 1.
Figure 3:
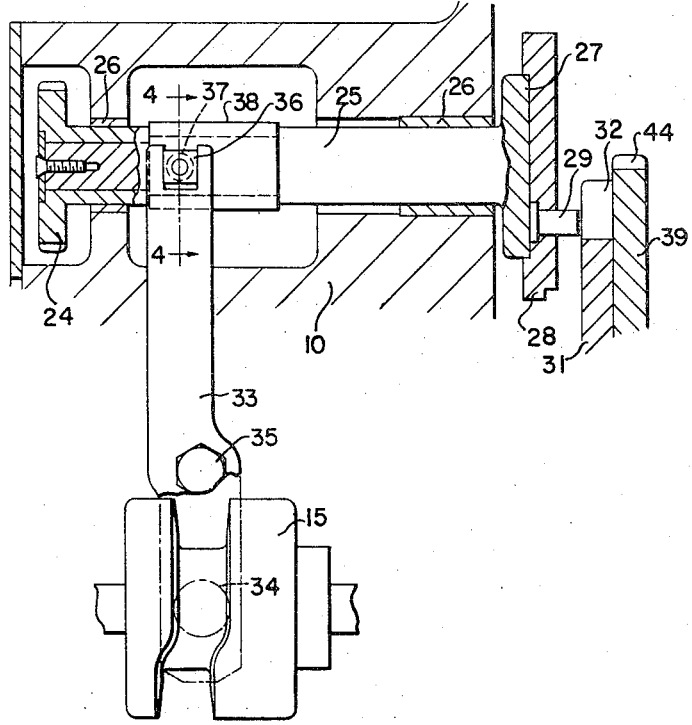
Fig. 3 is a fragmentary view partly in elevation and partly in section in the plane 3—3 of Fig. 1.
Figure 4:
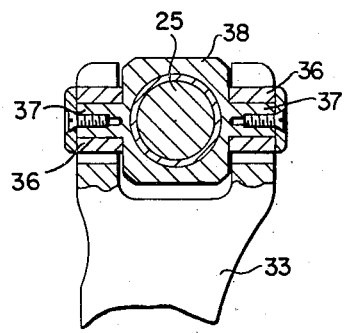
Fig. 4 is a detail sectional view in plane 4—4 of Fig. 3.
Figure 6:
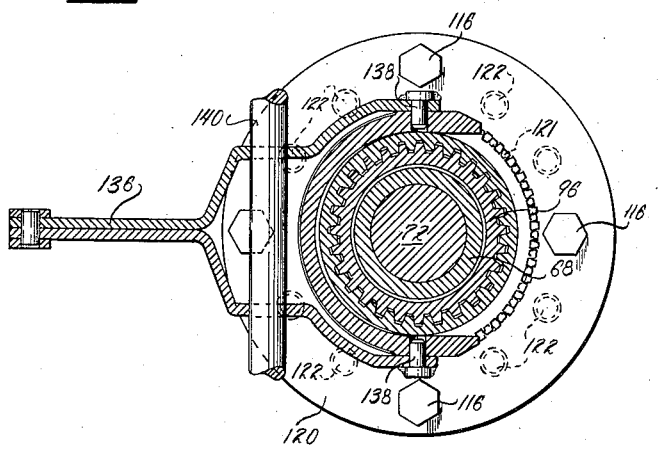
Fig. 6 is a fragmentary vertical sectional view in a plane perpendicular to Fig. 1.

Pin 29 constitutes the driver of a Geneva movement whose driven element is a disc 31 having a plurality of equispaced radial slots 32 in which the pin 29 is engageable when the shaft 25 is moved axially, to the right in Figs. 3 and 6. Axial motion of shaft 25 is effected by cam 15 acting through a lever 33, Figs. 1, 2 and 3, which at one end has a follower roller 34 engaging in a peripheral cam groove in the cam member 15. Intermediate of its ends the lever is fulcrumed to the housing 10 by pivot screw 35 that is anchored to part 40 of the housing. The opposite ends of the lever is forked to straddle shaft 25, each branch of the fork having a slot in which a crosshead 36 is slidable. The cross-heads are mounted on diametrically opposed trunnions 37 extending from a sleeve 38 which is rotatable on the shaft 25 but is confined against axial motion relatve thereto between a shoulder on the shaft of the hub of gear 24.

The Geneva driven disc 31 is secured to an index plate 39 and, together therewith, constitutes the intermediate member of the index mechanism. This intermediate member is rotatable on anti-friction bearings 41 on a driven member 42, which, in the case where the index mechanism is for a bevel gear machine, may constitute the work spindle of the machine. This spindle, 42, is rotatable in frame 10 on anti-friction bearings 43. On the periphery of plate 39 are a plurality of equi-spaced notches 44 corresponding in number to the number of slots 32. For locking the index wheel a lock dog 45 is engageable in a notch 44, this being pivoted to the housing 10 by a pivot pin 46 and being urged into locking position by resilient means comprising a spring-backed plunger 47 supported by the housing. For lifting the lock dog clear of notch 44 to enable indexing action, a cam follower 48 on the lock dog is arranged to ride on the peripheral cam surface of cam disc 28.

The mechanism thus far described in detail differs in principle from the index disclosed in the aforementioned patent only in that the disc 39 is not affixed to driven member 42. In operation the drive shaft 11 constantly rotaes shaft 25 through gearing 18, 19, 23, 24, and also rotates the cam 15 constantly but at a lower speed by reason of reduction gearing 13, 14. In the example illustrated the ratios of gear pairs 13, 14 and 18, 19 and 23, 24 are such that for each revolution of cam 15 the shaft 25 makes twelve turns. Accordingly once during each twelve turns of shaft 25 the cam 15 acts through lever 33 to shift shaft 25 axially to bring the pin 29 and cam disc 28 respectively into the planes of disc 31 and cam follower 48. During the ensuing rotation of the shaft 25 the cam 28 acts on follower 48 to lift the lock dog 45 from the notch 44 in which it is engaged, and immediately thereafter the pin 29 enters into a radial slot 32 in disc 31 and rotatively advances the assembly 31, 39 by one circular pitch. As soon as the pin leaves the slot the cam 28 allows the lock dog 45 to seat in the notch 44 that is then beneath it. The cam 15 now retracts the shaft 25 so that during its next eleven turns the pin 29 and cam 28 are idle.

According to the present invention a disc 49 is secured to and thereby is made a part of the driven member 42. Journaled in disc 49 on anti-friction bearings 52 is a shaft 51 having thereon a pinion 53. This pinion meshes with a ring gear 54 that is affixed to the housing in concentric relation to the spindle 42. Also fixed on shaft 51 is a cam 55 engaged by a cam follower roller 56 that is rotatable on a pin 57 anchored to index plate 39. The cam is held against roller 56 by resilient means comprising a roller 58 mounted on a spring-biased bell crank 59 which is fulcrumed upon the index plate 39 by a pivot pin 61, the bell crank being constantly urged about its pivot by a spring 62, in a counterclockwise direction in Fig. 1. This spring is supported in a thimble 63 that is also secured to the index plate 39.

The ratio of gears 53, 54, the number of slots and notches 32, 44, and the design of cam 55, all depend upon the particular use to which the index mechanism is to be put. The workpiece shown as an example in Fig. 8 is a gear segment W having four tooth spaces $S^1$, $S^2$, $S^3$ and $S^4$ whose angular pitches $A'$ and $A'''$ are such (27.316 degrees) that a complete gear having teeth of such pitch would have a non-integral number of teeth, namely 13.15 teeth. The middle tooth is 0.010 inch thicker at the pitch circle P (whose radius is 1.125 inches) than the other teeth, so that angular pitch $A''$ is 27.812 degrees. The Geneva plate 31 selected in this case is one having thirteen equi-spaced slots 32, the index plate 39 accordingly having thirteen equi-spaced notches 44, i. e. an angular pitch A equal to 27.692 degrees. The gears 53, 54 have a ratio of 4:13 so that for each indexing operation, which advances the plate 39 by angle A, the cam 55 is rotated three and one-quarter turns with respect to its follower roller 56. Thus the effect of each indexing operation is to advance the cam by one-quarter turn. Each quadrant of the cam has a different radius, $R^1$, $R^2$, $R^3$ and $R^4$, respectively. When the first tooth space $S^1$ is being cut the quadrant having radius $R^1$ is effective, while when the next space $S^2$ is cut the quadrant with radius $R^2$ is effective, and so forth. Thus $R^2$ must be greater than $R^1$ by an amount which will reduce the advance of the index plate from A to $A'$; $R^3$ less than $R^2$ by an amount which will increase the advance of the index plate from A to $A''$, and $R^4$ greater than $R^3$ by an amount which will reduce the advance of the index plate from A to $A'''$. It will be seen that every fourth indexing operation returns the cam 55 to its original position with respect to follower roller 56. Hence as soon as the index mechanism operates following the cutting of the last tooth, the work spindle of the machine will be in proper position, relative to the index mechanism, to cut the first tooth of the next workpiece.

It will be understood that the cam 55 may be made with whatever number of different radii $R^1$, $R^2$, etc. is necessary for any given workpiece, and that the ratio of gearing 53, 54 and the number of slots 32 and notches 44 may be modified accordingly. If it is desired to operate the index in the conventional manner, for example to cut gears of uniform pitch and integral tooth number, it is only necessary either to substitute a circular disc for the cam 51 or to remove pinion 53, to thereby render the cam 55 ineffective, and to bolt the disc 49 rigidly to the index plate 39.

It will be understood further that the foregoing disclosure is made by way of illustration and example, and not by way of limitation, and, accordingly, that various changes in the form and arrangement of the parts of the index mechanism may be made without departing from the spirit of the invention or from the scope of the appended claims.

What is claimed is:

1. An index mechanism comprising a frame, drive and driven members rotatable on the frame, an intermediate member rotatable on the same axis with the driven member, means for turning the intermediate member intermittently upon rotation of the drive member, a cam and a cam follower for turning the driven member relative to the intermediate member, the cam being rotatable on one of the intermediate and driven members and the follower being on the other one thereof, and means operating by and upon turning of the intermediate and driven members for rotating the cam.

2. A mechanism according to claim 1 in which there is a resilient means effective between the intermediate and driven members for holding the cam engaged with the follower.

3. A mechanism according to claim 1 in which the drive and driven members are rotatable on parallel axes, and the means for turning the intermediate member intermittently upon rotation of the drive member comprises a plurality of radial slots in the intermediate member and a pin on the drive member engageable successively in said slots upon rotation of the drive member.

4. A mechanism according to claim 1 in which the means for rotating the cam comprises gearing effective between the frame and the cam.

5. A mechanism according to claim 4 in which said gearing comprises a gear fixed to the frame in coaxial relation to the driven member and a pinion rotatable with the cam.

6. A mechanism according to claim 1 in which the cam is rotatable on the driven member and the cam follower is on the intermediate member.

7. A mechanism according to claim 6 in which there is a spring-backed roller carried by the driven member for holding the cam engaged with the cam follower, said roller engaging a portion of the cam that is at least approximately diametrically opposed to the follower.

8. A mechanism according to claim 1 in which there is a means for holding the intermediate member against rotation relative to the frame while the intermediate member is not being moved by said means for turning the intermediate member intermittently.

9. A mechanism according to claim 8 in which the means for holding the intermediate member comprises a plurality of circumferentially spaced notches in the intermediate member, a lock dog movable on the frame and engageable successively in said notches, and a cam rotatable with the drive member and acting on the lock dog to disengage it from the intermediate member when the latter is not being moved by said means for turning the intermediate member intermittently.

10. An index mechanism comprising a frame, drive and driven members rotatable on the frame on parallel axes, an intermediate member rotatable on the same axis with the driven member, the intermediate member having a plurality of radial slots therein and the drive member having a drive pin engageable successively in said slots for effecting intermittent rotation of the intermediate and driven members upon rotation of the drive member, the intermediate member having a plurality of circumferentially spaced notches, a lock dog movable on the frame and engageable successively in said notches to hold the intermediate member against rotation, a cam rotatable with the drive member and acting on the lock dog to periodically disengage it from the intermediate member, a second cam and a follower therefor for turning the driven member relative to the intermediate member the second cam being rotatable on one of the intermediate and driven members and the follower being on the other one thereof, resilient means for holding the follower engaged with the second cam, and gearing between the frame and the second cam for rotating the latter upon turning of the intermediate and driven members relative to the frame, said gearing including a gear fixed to the frame in coaxial relation to the driven member.

References Cited in the file of this patent

UNITED STATES PATENTS

| | | |
|---|---|---|
| 1,748,540 | Curtis | Feb. 25, 1930 |
| 1,788,423 | Drissner et al. | Jan. 13, 1931 |
| 2,188,996 | Carlsen | Feb. 6, 1940 |
| 2,448,426 | Galloway | Aug. 31, 1948 |

FOREIGN PATENTS

| | | |
|---|---|---|
| 107,658 | Sweden | June 15, 1943 |